Figure 1:
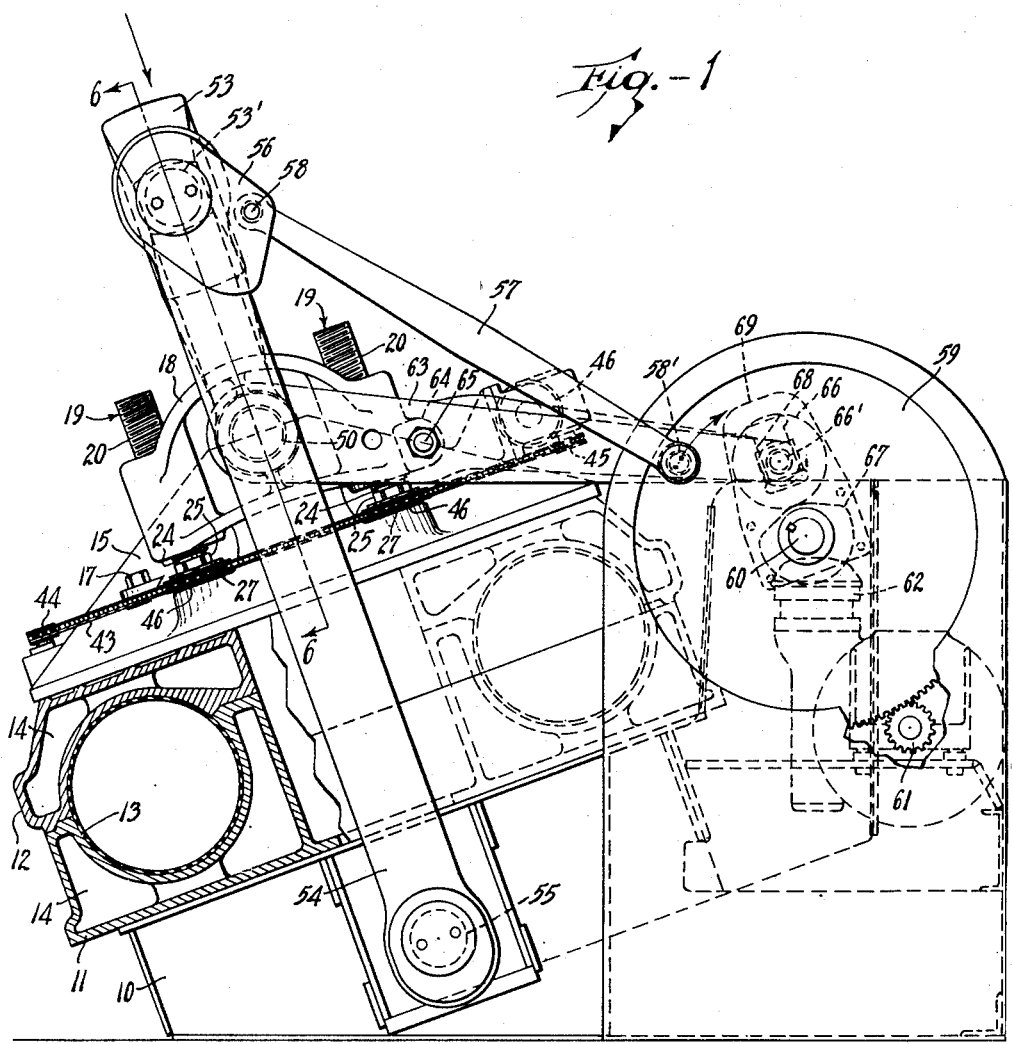

April 4, 1944.  L. E. SODERQUIST ET AL  2,345,838
VULCANIZING PRESS AND THE LIKE
Filed Feb. 5, 1942  3 Sheets-Sheet 1

INVENTORS
LESLIE E. SODERQUIST
THOMAS H. WILLIAMS

Ely & Frye
ATTORNEYS

April 4, 1944.     L. E. SODERQUIST ET AL     2,345,838
VULCANIZING PRESS AND THE LIKE
Filed Feb. 5, 1942     3 Sheets-Sheet 2

INVENTORS
LESLIE E. SODERQUIST
THOMAS H. WILLIAMS.
ATTORNEYS

April 4, 1944.  L. E. SODERQUIST ET AL  2,345,838
VULCANIZING PRESS AND THE LIKE
Filed Feb. 5, 1942  3 Sheets-Sheet 3
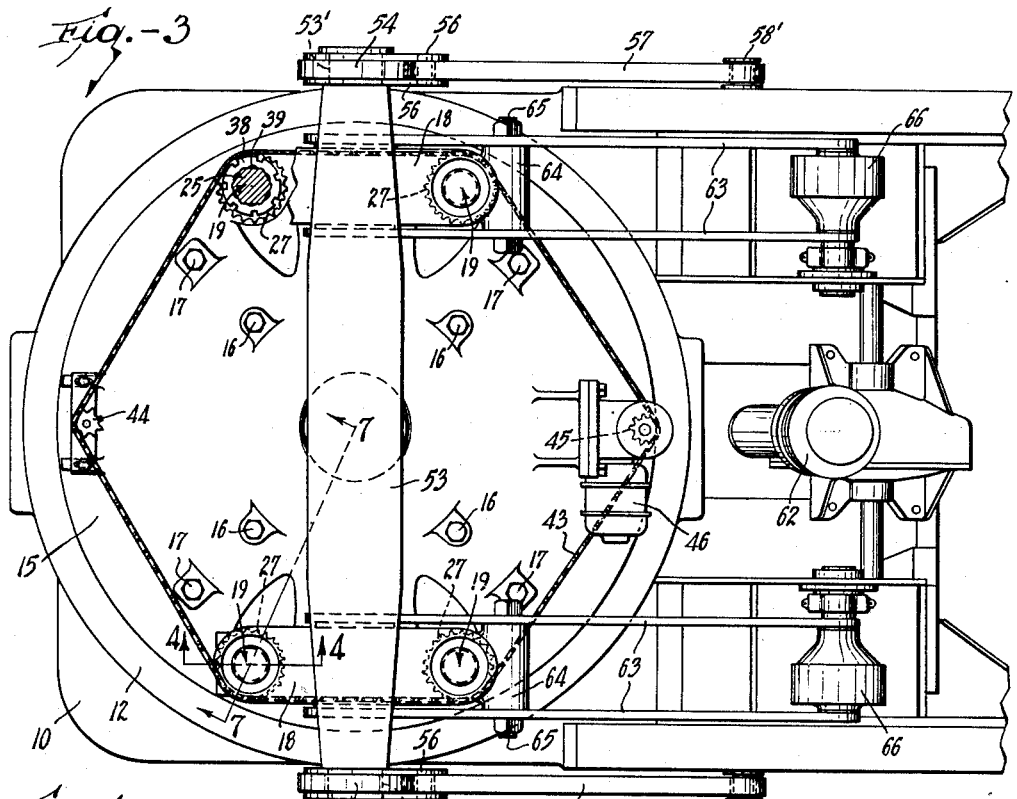
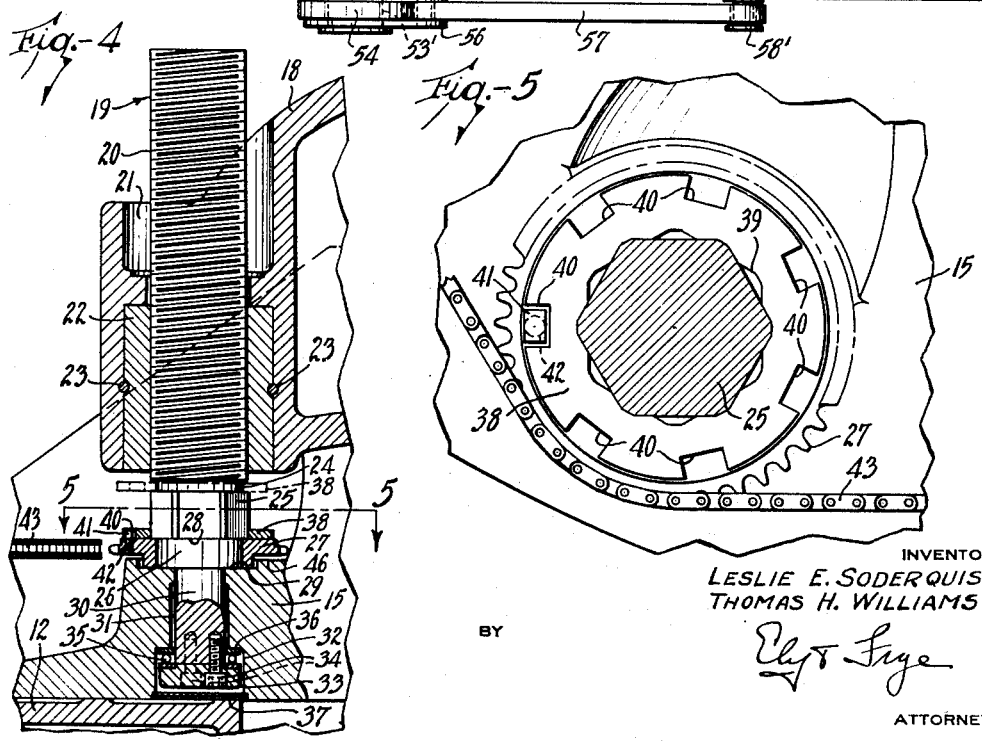
INVENTORS
LESLIE E. SODERQUIST
THOMAS H. WILLIAMS
BY
ATTORNEYS Patented Apr. 4, 1944

2,345,838

UNITED STATES PATENT OFFICE 2,345,838

VULCANIZING PRESS AND THE LIKE

Leslie E. Soderquist and Thomas H. Williams, Akron, Ohio, assignors to The McNeil Machine & Engineering Company, Akron, Ohio, a corporation of Ohio Application February 5, 1942, Serial No. 429,666

10 Claims. (Cl. 18—17)

This invention relates to improvements in presses for vulcanizing pneumatic tires and inner tubes therefor.

In presses of this type and more particularly in large size presses such as are used for vulcanizing tires and tubes for bomber airplanes, the mold sections are as large as six to eight feet in diameter and the entire press weighs in the neighborhood of twenty tons. Consequently, it is quite a problem to secure the upper movable mold section and movable upper platen to the press head so as to permit proper adjustment between the press head and these other movable members. Usually a plurality of adjustable screws or bolts are used to secure the press head and the upper platen together and if individual adjustment of each screw is attempted it sometimes requires several thousand turns.

It is an object of this invention to provide mechanism for turning all of the screws simultaneously and to utilize a motor for operating the mechanism.

Another object is to provide a detachable connection between the drive means and each screw which will permit turning of the screws by the drive means when the connection is operative, and which can be readily disconnected to allow individual adjustment of each screw if such adjustment becomes desirable.

A further object is to provide novel means for controlling the opening and closing movement of the press whereby the upper mold section in opening first moves in a rectilinear path parallel with the lower mold section and then tilts or pivots to its fully open position, with the closing movement being the reverse of the opening movement.

Other objects and advantages will become apparent from the following description taken in conjunction with the accompanying drawings.

Figure 6:
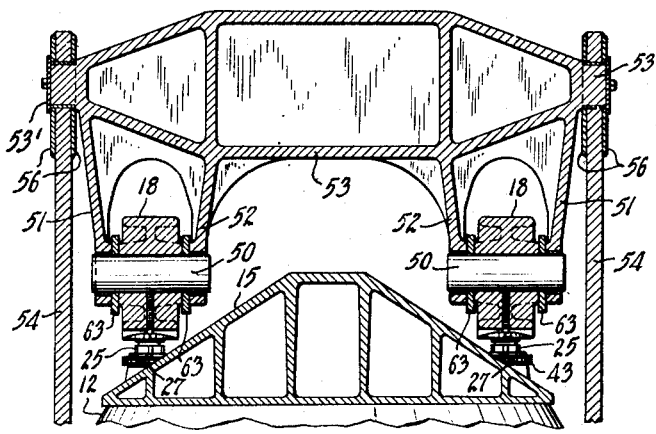
Figure 2:
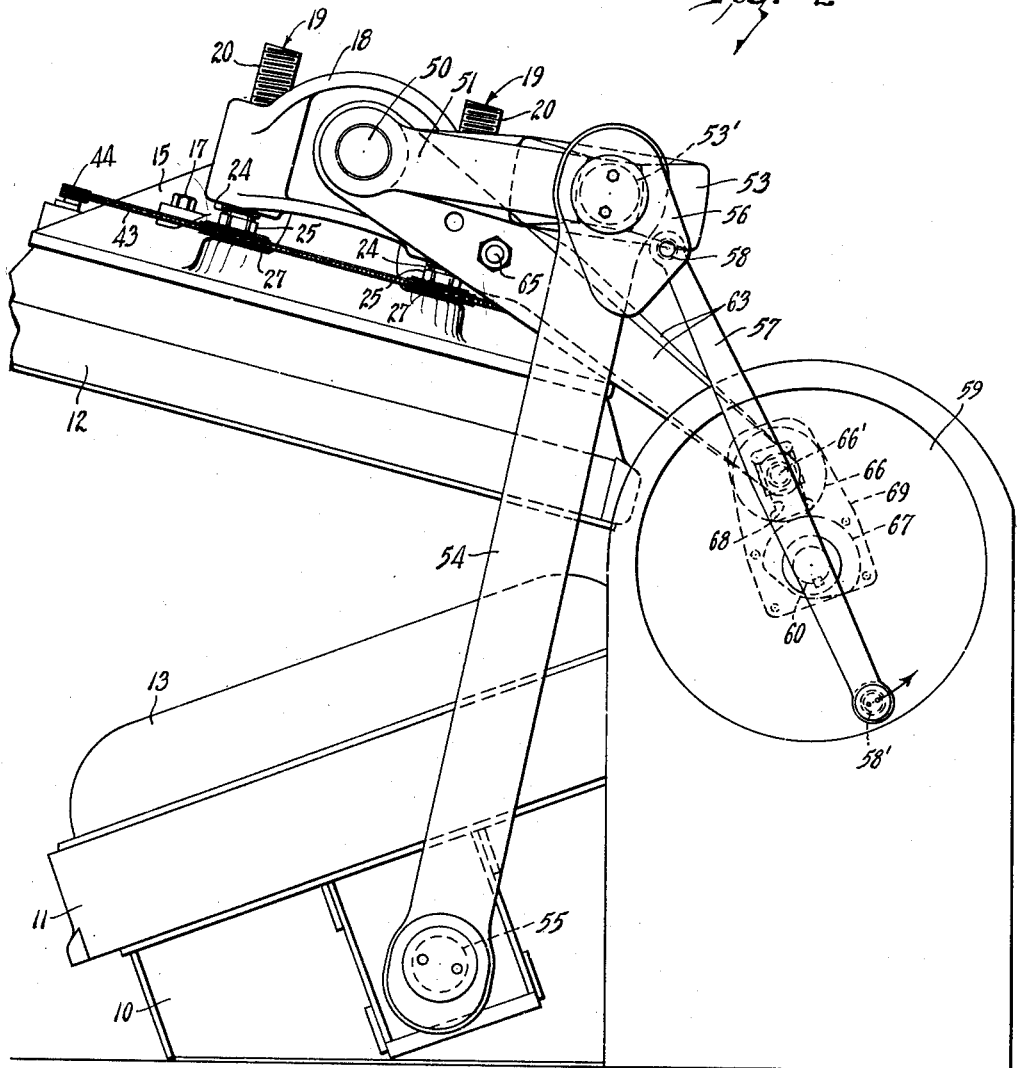
Figure 7:
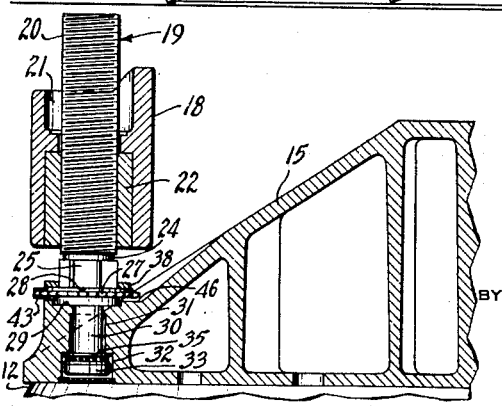

In the drawings:

Fig. 1 is a side elevation of a press in closed position with some parts shown in section, Fig. 2 is a similar view of the press fully open, Fig. 3 is a partial plan view of the press as shown in Fig. 1 looking in the direction of the arrow in Fig. 1, Fig. 4 is an enlarged fragmentary sectional view taken substantially on line 4—4 of Fig. 3, Fig. 5 is a similar view taken substantially on line 5—5 of Fig. 4, Fig. 6 is a partial sectional view taken substantially on line 6—6 of Fig. 1, and Fig. 7 is a similar view taken substantially on line 7—7 of Fig. 3.

Referring to the drawings a vulcanizing press to which this invention may be applied comprises a base 10 upon which is supported the fixed lower section 11 of a vulcanizing mold. The press shown is for vulcanizing inner tubes and the mold section 11 is arranged diagonally on base 10 in accordance with standard practice in tube molds. In a tire press the lower mold section would preferably be supported in a horizontal plane as is well understood in this art.

An upper mold section 12 complementary to the section 11 is arranged, as shown in Fig. 1 when the mold sections are closed, whereby the upper and lower mold sections receive an inner tube 13 or other inflatable member in the usual manner. The mold sections are chambered as at 14 to receive steam or other curing medium and the tube 13 is inflated and deflated in the conventional manner through valves (not shown).

Upper mold section 12 is rigidly secured to an upper movable platen 15 by means of two series of spaced bolts 16 and 17 (Fig. 3). As shown, bolts 16 are arranged at four spaced points around the center of platen 15, while bolts 17 are spaced outwardly of the bolts 16. The upper platen 15 is adjustably secured at opposite sides to a press head formed of two spaced yoke-like members 18, each of which threadably receives a pair of large elongated spaced bolts or screws indicated as a whole by the numeral 19, which are rotatably received and held at their lower ends in the upper platen 15. Fig. 4 clearly shows the relationship of one of the screws 19 with respect to the press head and upper platen, and since this relationship is the same for all of the screws 19, a description of one will suffice for all.

Referring to Fig. 4, each screw 19 has an upper threaded portion 20 which extends through an opening 21 in member 18 into threaded engagement with a nut 22 secured in member 18 by a pair of pins 23. Immediately below its threaded portion each screw 19 has a reduced portion 24 and then it has a hexagonal portion 25 which permits turning of the screw. Below the latter portion each screw is again reduced in diameter as at 26 whereby a freely rotatable sprocket 27 may have its hub portion held between a shoulder 28 on the screw and a flattened surface 29 formed on upper platen 15. Each screw then terminates in a lower further reduced portion 30 which extends into an opening 31 formed in upper platen 15. Each opening 31 is enlarged as at 32 and extends to the bottom of upper platen 15 whereby a cap or flange 33 is secured to the lower end of each screw 19 by suitable fastening means such as screws 34. A ball bearing 35 is secured between the upper surface of flange 33 and a shoulder 36 formed in platen 15 so as to eliminate friction between the screws 19 and platen 15. A removable closure member 37 may be suitably fitted into the lower end of opening 31 as indicated.

It will be apparent from the foregoing that each screw 19 is mounted for rotation with its lower end held in platen 15 and its threaded portion 20 in engagement with the fixed nut 22 held in member 18, whereby turning of screws 19 will cause the upper platen 15 and the press head members 18 to move toward and away from each other, depending on the direction of rotation.

To permit turning of the four screws 19 simultaneously and automatically, a coupling member 38 is provided to form a driving engagement between each screw 19 and its associated sprocket 27. As more clearly shown in Fig. 5, each coupling member 38 is in the form of a ring having a central opening 39 of dodecagonal shape which can be fitted tightly over the hexagonal portion 25 of each screw 19, while the outer periphery of member 38 is provided with a plurality of spaced openings 40, any one of which can be aligned with the rectangular upper portion 41 of a pin 42 carried by and projecting upwardly from each sprocket 27.

When the coupling members 38 are not in use they may be moved above the hexagonal portion 25 of screw 19 into the reduced portion 24 and then moved eccentrically as indicated in dash lines in Fig. 4, so as not to interfere with manual turning of the screw. In use, coupling member 38 is moved to the full line position shown in Fig. 4 whereby pin 42 will form a locking engagement with member 38, and since the latter acts as a tool or wrench while in driving engagement with the hexagonal portion of screw 19, it is only necessary to rotate the sprocket 27 in order to turn the screw 19. Obviously, the same result could be obtained by reversing the pin and slot arrangement for connecting the sprocket and coupling member together.

Referring to Fig. 3, a drive chain 43 is arranged to engage the teeth of each sprocket 27 to rotate all of the screws 19 simultaneously and the path of chain 43 carries it into engagement with the teeth of an idler sprocket 44 suitably adjustably mounted on the upper platen 15, as well as into engagement with a drive sprocket 45. The latter is also suitably mounted on the upper platen 15 and is driven by motor 46 through conventional connections (not shown). Motor 46 may also be suitably supported by platen 15. As is more clearly shown in Figs. 1 and 7, the upper platen 15 is generally of cone shape with a flat top, and flat portions 46 are provided for the entrance of the four screws 19 and for unobstructed operation of the sprockets 27.

In assembling the upper platen 15 and the press head members 18, the lower portions of four screws 19 are first placed in platen 15 with the sprockets 27 and coupling members 38 mounted as shown in full lines in Fig. 4. The lower ends of the nuts 22, carried by members 18, are then placed on the top of screws 19. The chain 43 is then placed in position on the several sprockets and motor 46 is started to drive the chain. As the screws 19 are thus rotated, the press head members will simultaneously move down the threaded portions of screws 19 toward platen 15 and any desired adjustment between the latter and the press head members 18 may be quickly and easily secured. If it is desirable to rotate any of the screws manually for a few turns, the coupling members 38 may be moved from the full line position to the broken line position in Fig. 4, so as to make the sprockets inoperative to turn the screws, and to permit application of a suitable hand tool to the hexagonal portion 25 of the screws.

The upper mold section 12, upper platen 15 and press head members 18 are designed to move in unison during the opening and closing of the press, and to this end, each press head member has a short shaft 50 journaled centrally therein. Each shaft 50 has a pair of arms 51 and 52 mounted for rocking movement on the ends of the respective shafts, which arms are formed integral with a rocking cross beam 53 that has its outer ends 53' journaled in the upper end portions of a pair of side arms 54. The latter arms are pivoted to the base of the press as indicated at 55, and adjacent their upper ends are each provided with a pair of integral lateral extension arms 56. Between each pair of arms 56, one end of a link 57 is pivoted as at 58, while the opposite end of each link is pivoted to a crank arm 58' extending outwardly from the side face of a gear wheel 59 keyed to a shaft 60 which is suitably mounted for rotation at the rear of the press. Each gear wheel 59 is in mesh with a pinion 61 which is driven through conventional connections (not shown) by a reversing motor 62, whereby when the motor is in operation the gear wheels will rotate clockwise from the position shown in Fig. 1 to the position shown in Fig. 2 to open the press. As the gear wheels rotate clockwise, links 57 will pull the upper ends of side arms 54 rearwardly or to the right as viewed in Figs. 1 and 2, causing the parts to assume the position shown in Fig. 2.

Each shaft 50 carries one end of a pair of guide arms 63 which are located between arms 51 and 52 and the press head members 18 (see Fig. 6). Each member 18 has a rearward extension 64 (Fig. 1) which receives a bolt 65 that passes through both guide arms 63 and secures the latter to the member 18 to prevent relative movement therebetween. Each pair of arms 63 extend rearwardly and carry a roller 66 rotatably mounted between their rear ends as shown in Fig. 3. Each roller 66 engages a cam 67 (Fig. 1) fixed on shaft 60 so that as the latter shaft turns during opening and closing of the press, the rollers 66, arms 63 and the press members 12, 15 and 18 will move in accordance with the surfaces of the cams 67.

With the cams 67 designed as shown in Fig. 1 and with the press in the closed position shown in the latter figure, the press may be opened by rotating shaft 60 and gear wheels 59 clockwise to the position shown in Fig. 2, whereby cams 67 will first cause the upper mold section 12 to move away from the lower mold section 11 in a rectilinear path for about one and one-fourth inches. In other words the two sections remain in parallel relationship for about the distance mentioned and then the upper mold section will swing in an arcuate path to the position shown in Fig. 2.

During closing movement of the press, which is accomplished by turning gear wheels 59 in a counter-clockwise direction from the position shown in Fig. 2, the movement of the parts is the reverse of the opening movement, and the upper mold section will finish about the last inch and a quarter of its closing movement in parallel position with the lower mold section so as not to damage an uncured tire or tube which would be in the lower mold section.

As the rollers 66 are raised and lowered by the action of cams 67, the roller pins 66' are guided in their movement by guide slots 68 formed in housings 69 carried by the rear of the press.

The quick assembly and adjustment of the press head, upper platen and upper mold section is not only useful when the press parts are originally put together, it is also effective to permit rapid changes and adjustments in the sizes of mold sections used in the press. For example, the mold sections 11 and 12 may be replaced by larger or smaller mold sections, the lower section being readily replacable on base 10, while the upper section may be replaced by operation of the securing bolts 16 and 17. After making these replacements we will assume the molds are of such size that the distance between the two new mold sections is too great to permit proper closing of the press. It is then only necessary to lower the upper mold section and upper platen by rotating the screws 19 until the desired fit is secured. Likewise, if the new mold sections are too close together, the upper platen and upper mold section may be moved upwardly by turning the screws 19 until the desired adjustment is obtained.

While we have shown and described the preferred form of our invention it will be apparent that the invention is not so limited, and modifications may be resorted to without departing from the spirit of the invention or from the scope of the subjoined claims.

What is claimed is:

1. In a vulcanizing press of the character described having a pair of mold sections at least one of which is movable to open and close the press, a movable supporting member for said movable mold section, means for relatively spacing said supporting member and said movable mold section comprising a plurality of spaced rotatable screws connected between said movable mold section and said supporting member, a sprocket arranged to be inoperatively mounted on each screw, a coupling member operatively mounted on each screw, means for connecting the coupling member and sprocket together to render the latter operative to rotate one of the screws, and drive means for rotating the sprockets simultaneously.

2. In a vulcanizing press of the character described having a pair of mold sections at least one of which is movable to open and close the press, a platen secured to said movable mold section and adapted to move therewith, a movable supporting member for said platen and said movable mold section, means for relatively spacing said supporting member and said movable mold section comprising a plurality of spaced rotatable screws connected at one end to said platen and at their other end to said supporting member, a sprocket arranged to be inoperatively mounted on each screw and having a projection, a coupling member operatively mounted on each screw and having an opening which is adapted to receive the projection on an adjacent sprocket to render the latter operative to rotate one of the screws, and drive means for rotating the sprockets simultaneously.

3. In a vulcanizing press of the character described having an upper and a lower mold section with at least the upper section being movable to open and close the press, an upper platen secured to said upper mold section and being movable therewith, a movable press head for supporting said platen and upper mold section, means for relatively spacing said press head and said platen comprising a plurality of spaced rotatable screws each having a tool gripping portion and connected at one end to said platen and at their other end to said press head, a sprocket arranged to be inoperatively mounted on each screw adjacent said tool gripping portion and having a projection, a coupling member operatively mounted on the tool gripping portion of each screw and having a plurality of openings any one of which is adapted to receive the projection on an adjacent sprocket to render the latter operative to rotate one of the screws, and drive means for rotating the sprockets simultaneously.

4. A device constructed in accordance with claim 2 wherein at least one of said screws is provided with a reduced portion into which said coupling member may be moved to an inoperative position on its associated screw to thereby render its associated sprocket inoperative and to allow application of a hand tool to such screw.

5. In a vulcanizing press of the character described comprising at least one movable mold section and a movable supporting member for said mold section, and having means for relatively spacing the supporting member and mold section comprising a plurality of spaced rotatable screws arranged between the supporting member and mold section, with each screw having a tool gripping portion, means for simultaneously rotating said screws comprising a sprocket arranged to be inoperatively mounted on each screw adjacent said tool gripping portion and having a projection, a coupling member operatively mounted on the tool gripping portion of each screw and having a plurality of openings any one of which is adapted to receive the projection on an adjacent sprocket to render the latter operative to rotate one of the screws, and a chain for rotating the sprockets in unison.

6. A device constructed in accordance with claim 5 wherein at least one of said screens is provided with a reduced portion into which said coupling member may be moved to an inoperative position on its associated screw to thereby render its associated sprocket inoperative and to allow application of a hand tool to such screw.

7. In means for simultaneously rotating a plurality of screws, the combination of a sprocket arranegd to be inoperatively mounted on each screw, a coupling member adapted to be operatively mounted on each screw, means for connecting the coupling member and sprocket together to render the latter operative to rotate one of the screws, and a driven chain for rotating the sprockets in unison.

8. A device constructed in accordance with claim 7 wherein said coupling member may be moved to an inoperative position on its associated screw to thereby render its associated sprocket inoperative and to allow application of a hand tool to such screw.

9. In means for simultaneously rotating a plurality of screws each having a tool gripping portion, the combination of a sprocket arranged to be inoperatively mounted on each screw adjacent said tool gripping portion and having a projection, a coupling member adapted to be operatively mounted on the tool gripping portion of each screw and having an opening which is adapted to receive the projection on an adjacent sprocket to render the latter operative to rotate one of the screws, and a driven chain for rotating the sprockets in unison.

10. A device constructed in accordance with claim 9 wherein said coupling member may be moved to an inoperative position on its associated screw to thereby render its associated sprocket inoperative and to allow application of a hand tool to such screw.

LESLIE E. SODERQUIST.
THOMAS H. WILLIAMS.